United States Patent
Yamamura et al.

(10) Patent No.: US 8,037,959 B2
(45) Date of Patent: Oct. 18, 2011

(54) ALL TERRAIN VEHICLE WITH RADIATOR PROTECTION

(75) Inventors: Takashi Yamamura, Shizuoka (JP); Motoyuki Hara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 346 days.

(21) Appl. No.: 12/365,541

(22) Filed: Feb. 4, 2009

(65) Prior Publication Data

US 2010/0194087 A1    Aug. 5, 2010

(51) Int. Cl.
B60K 11/04    (2006.01)
B62D 21/00    (2006.01)
(52) U.S. Cl. ........................ 180/68.4; 280/781
(58) Field of Classification Search .......... 180/68.4, 180/68.6, 311, 312, 908; 280/781
See application file for complete search history.

(56) References Cited

U.S. PATENT DOCUMENTS

| | | | |
|---|---|---|---|
| 6,250,377 B1 * | 6/2001 | Gyenese, Jr. ......... | 165/104.32 |
| 6,264,241 B1 * | 7/2001 | Horiuchi ............... | 280/781 |
| 7,753,427 B2 * | 7/2010 | Yamamura et al. ... | 296/63 |
| 7,819,428 B2 * | 10/2010 | Tsuruta et al. ........ | 280/781 |
| 2006/0197331 A1 * | 9/2006 | Davis et al. ........... | 280/781 |
| 2006/0278462 A1 * | 12/2006 | Kotrla ................... | 180/311 |
| 2008/0023249 A1 * | 1/2008 | Sunsdahl et al. ...... | 180/312 |
| 2008/0284124 A1 * | 11/2008 | Brady et al. ........... | 280/124.135 |

FOREIGN PATENT DOCUMENTS

JP    2006-103369    4/2006

* cited by examiner

Primary Examiner — J. Allen Shriver, II
Assistant Examiner — James M Dolak
(74) Attorney, Agent, or Firm — Keating & Bennett, LLP

(57) ABSTRACT

A vehicle including a main body frame having a length direction and a width direction includes a front frame carried by the main body frame. The front frame includes a first front cross frame having a generally height and extends along said main body's width direction. A second front cross frame is disposed frontward and offset from the first cross frame at an elevational height less than the first front cross frame. A first and second side frame interconnect with the first cross frame and the second cross frame to define radiator cage having an interior space. A radiator is disposed within the interior space of said radiator cage.

18 Claims, 7 Drawing Sheets

ALL TERRAIN VEHICLE WITH RADIATOR PROTECTION

BACKGROUND OF THE INVENTION

1. Field of the Invention

The present invention relates to an all terrain vehicle including a radiator mounted frontward of a vehicle body frame in a protective environment.

2. Description of the Related Art

In vehicles of the type including a radiator used to maintain the temperature of the engine coolant within a predetermined range, generally the radiator is mounted frontward of the vehicle body frame to increase cooling performance by flowing air. For example, in Japanese Unexamined Patent Application Publication No. 2006-103369, there is proposed a configuration including a radiator mounted frontward of cross pipes. More specifically, a front frame provided frontward of a vehicle body frame is configured into a U-shape in the plan view. The front frame includes left and right extending portions extending along a vehicle in a front-back direction, and cross portions that extend along the vehicle width direction which interconnect with rear ends of the respective left and right extending portions. Additional cross pipes are provided for interconnecting the left and right extending portions in the vehicle width direction. The radiator is mounted frontward of the cross pipes.

However, in the configuration as in the above-described conventional vehicle in which the radiator is disposed frontward of the cross pipes, while the radiator can be protected against external forces exerted from the vehicle lateral sides, there is a problem in that the radiator cannot be sufficiently protected against external forces exerted from the vehicle front side.

SUMMARY OF THE INVENTION

In view of the foregoing problem, an object of the present invention is to provide a vehicle that enables improving protection for a radiator against external forces exerted from both the vehicle lateral sides and vehicle front side.

According to one aspect of the present invention, an all terrain vehicle (ATV 1) includes a pair of left and right front wheels, a front panel provided rearward of the front wheels, a first front cross frame that is disposed in front of the front panel and extends generally across the vehicle in the width direction, a second front cross frame disposed forward and offset from the first front cross frame and also extending generally along the vehicle's width direction; a front left side frame and a front right side frame that respectively, are disposed on the left and right sides of the vehicle extending along the vehicle's front-back direction, and that respectively interconnect the first front cross frame and the second front cross frame. A first bracket is provided near a connection portion of the second front cross frame with the front left side frame, and supports a first cushion unit of a front wheel suspension system. A second bracket is provided near a connection portion of the second front cross frame with the front right side frame that supports a second cushion unit of a front wheel suspension system. These structures define a radiator cage having an interior. A radiator is mounted in a manner that is located in a rectangular space surrounded by the first front and second front cross frames and the left and right side frames.

According to the vehicle of the present invention, frame members include outer surfaces which define boundaries which the radiator does not pass. Hence, the first and the second front cross frames and the front left and right side frames function as protection members, thereby improving the protection performance against external forces exerted from both the vehicle lateral sides and vehicle frontward side.

Further, the first and the second brackets, respectively, for supporting the cushion units are provided near the connection portions of the second front cross frame with the front left and right side frames. Hence, external forces transmitted from the front wheels via the cushion units can be supported by the second front cross frame that has high stiffness, consequently it is possible to increase the support stiffness of the cushion units.

DESCRIPTION OF THE PREFERRED EMBODIMENTS

Figure 1:
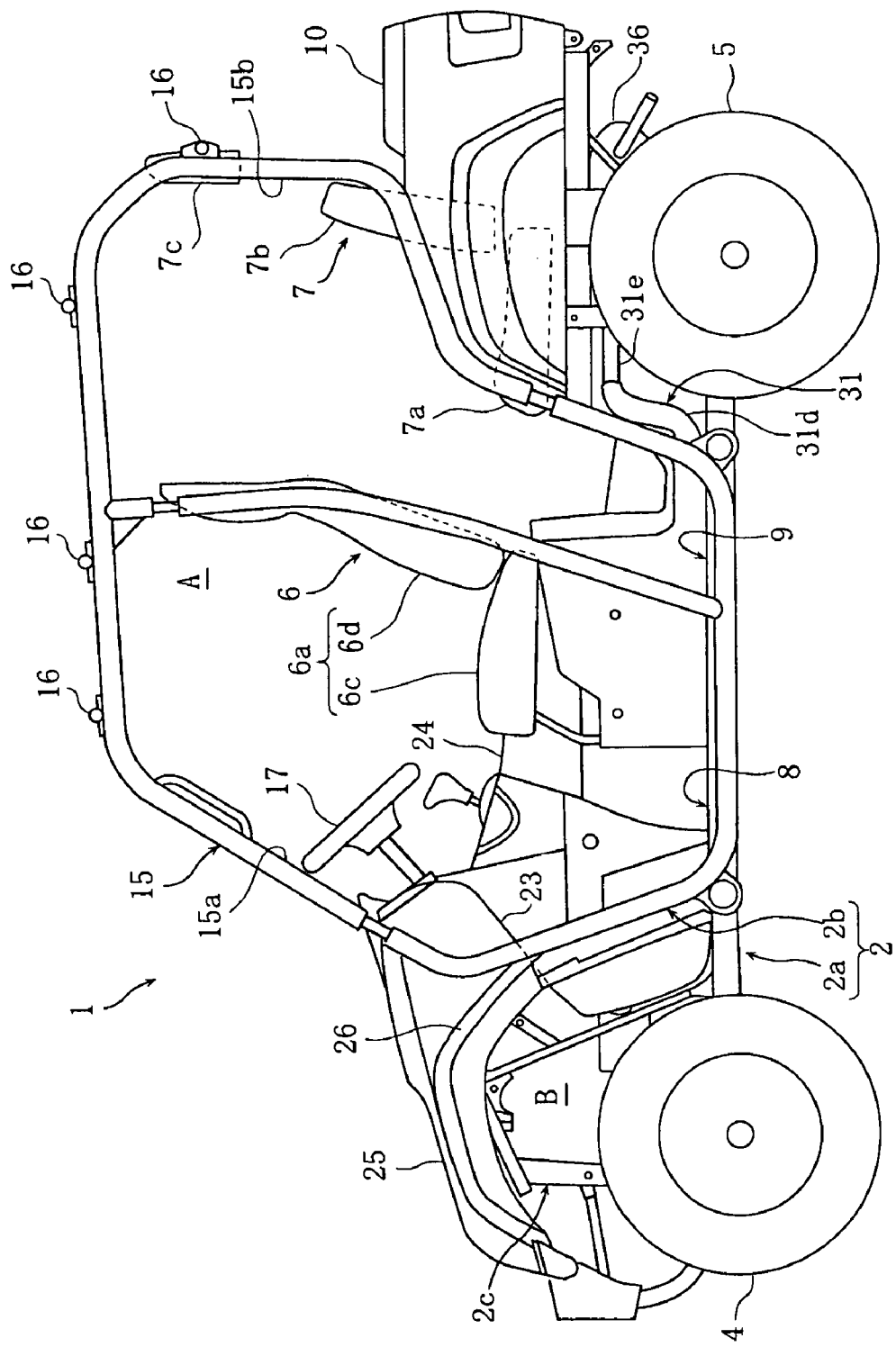
FIG. 1 is a side view of an all-terrain vehicle of one embodiment of the present invention.
Figure 2:
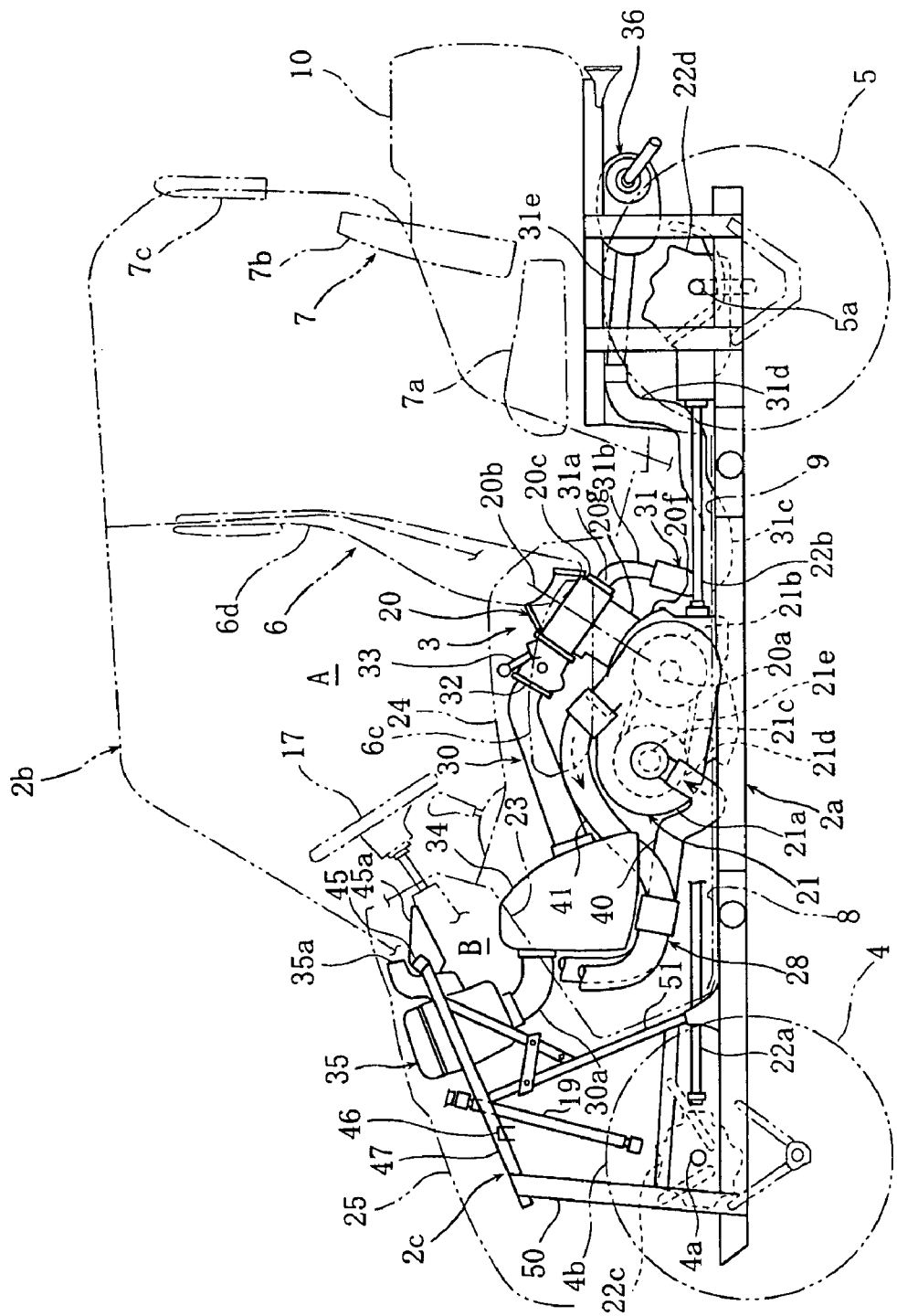
FIG. 2 is a side view of a vehicle body frame of the vehicle to which a radiator is mounted.

One embodiment of the present invention will be described with reference to the accompanying drawings.

FIGS. 1 to 7 are views of an all-terrain vehicle of one embodiment of the present invention. In the present embodiment, the front, rear, left, and right refer to the front, rear, left, and right in the state as viewed from a passenger who is sitting in a seat looking toward the front wheels unless otherwise specifically mentioned. Also, as shown in the Figures like parts are identified with the same numeral. The front wheels are the same on both the left and right sides, so they are referenced by like numeral 3. In some instances only the left side of the vehicle is shown, but it is understood that similar items on the right side, while not shown, are of similar nature.

With reference to the drawings, all terrain vehicle 1 (ATV 1) includes a vehicle body frame 2, a radiator 19, an engine unit 3, a pair of front wheels 4, and a pair of rear wheels 5. The radiator 19 is mounted in a front portion of the vehicle body frame 2. The engine unit 3 is mounted in a central portion of the vehicle body frame 2. The front wheels 4 are, respectively, disposed in left and right front end portions of the vehicle body frame 2. The rear wheels 5 are, respectively, disposed in left and right rear end portions.

The ATV 1 further includes a first seat 6 disposed in a front portion of the vehicle body frame 2, a second seat 7 disposed rearward of the first seat 6, a first floor 8 disposed frontward of the first seat 6, and a second floor 9 disposed between the first and the second seats 6 and 7.

The engine unit 3 is disposed between the first and the second floors 8 and 9. A cargo support 10 is disposed on the rear side of the second seat 7 of the vehicle body frame 2 substantially at the same height as a seat surface of the second seat 7.

The vehicle body frame 2 preferably includes main body frame 2a, pillar frames 2b, and front frame 2c. The left and right front wheels 4 and the engine unit 3 are disposed in the main body frame 2a. The pillar frames 2b are respectively elevationally formed on the left and right sides of the main body frame 2a, thereby forming a passenger compartment A.

The front frame 2c is disposed frontward of passenger compartment A of the main body frame 2a. The first and second seats 6 and 7 are disposed inside of the passenger compartment A.

Main body frame 2a includes left and right center members 12 extending along the vehicle in a front-back direction, and front and rear cross members 14F, 14R that interconnect between left and right center members 12. Plate-like cross members 13 interconnect midway portions of the respective center members 12. Engine unit 3 is mounted to cross members 13.

Figure 3:
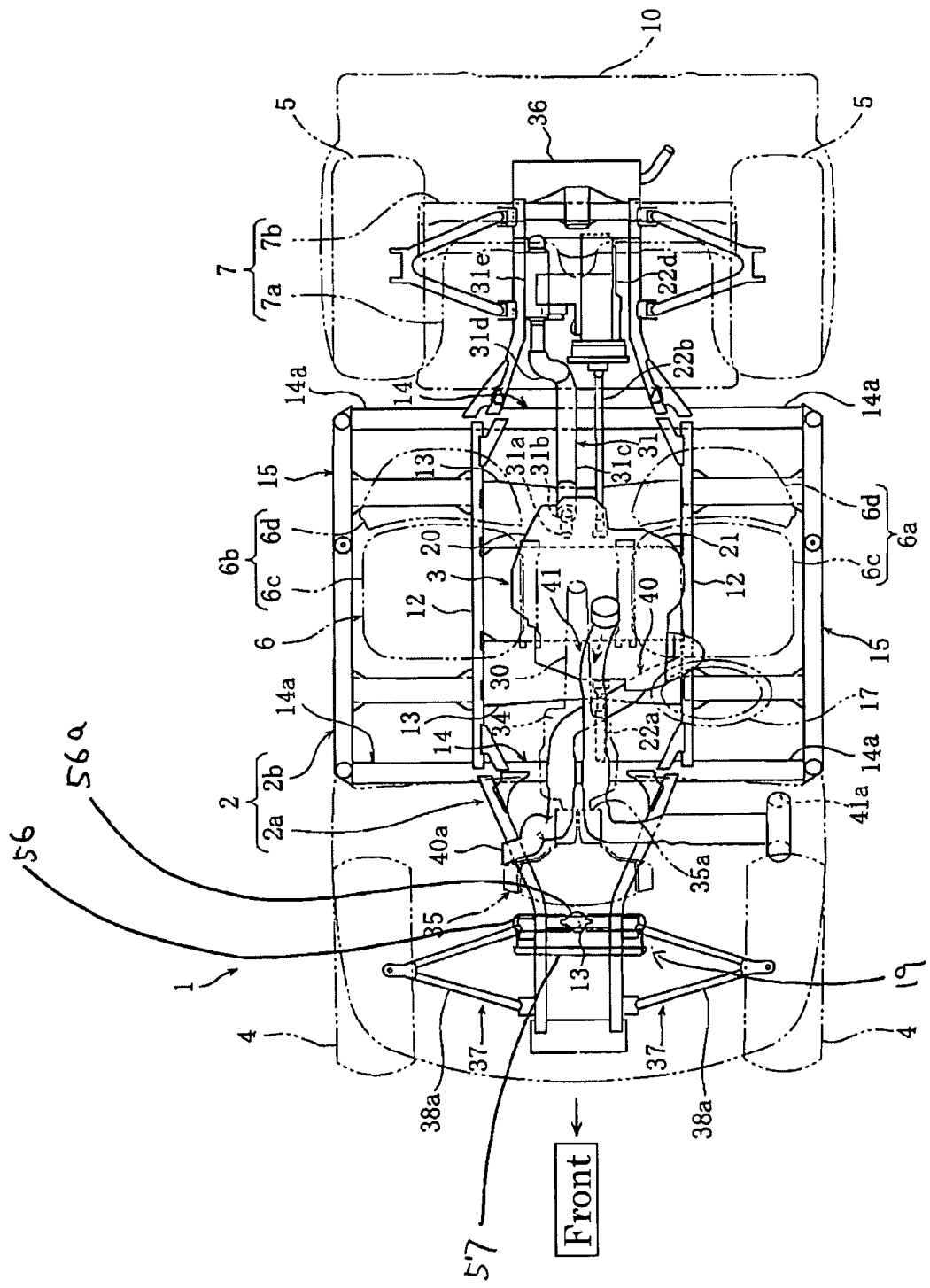
FIG. 3 is a plan view of the vehicle body frame.

As shown in FIGS. 1 and 3, pillar frame 2b is connected to outer end portions 14a of the front and rear cross members 14, and includes left and right pillar members 15 and multiple roof members 16. The left and right pillar members 15 have front and rear passenger entries 15a and 15b formed therein, and the roof members 16 interconnect between upper end portions of the left and right pillar members 15L and 15R.

The first seat 6 is separated into left and right seats 6L and 6R at a predetermined distance along the vehicle width direction. The left and right seats 6 include seat cushions 6c, seat backs 6d, and headrests 6e. A steering wheel 17 is disposed frontward of the left seat 6. The second seat 7 is disposed approximately at the same height as the first seat 6, and includes a bench seat cushion 7a and a seat back 7b allowing two persons to be seated. A headrest 7c is disposed above the seat back 7b.

The ATV 1 further includes a partition wall 23 and a hood 25. The partition wall 23 partitions the passenger compartment A from a front compartment B. The hood 25 is disposed frontward of the partition wall 23 and opens or closes an upper end portion of the front compartment B.

Figure 4:
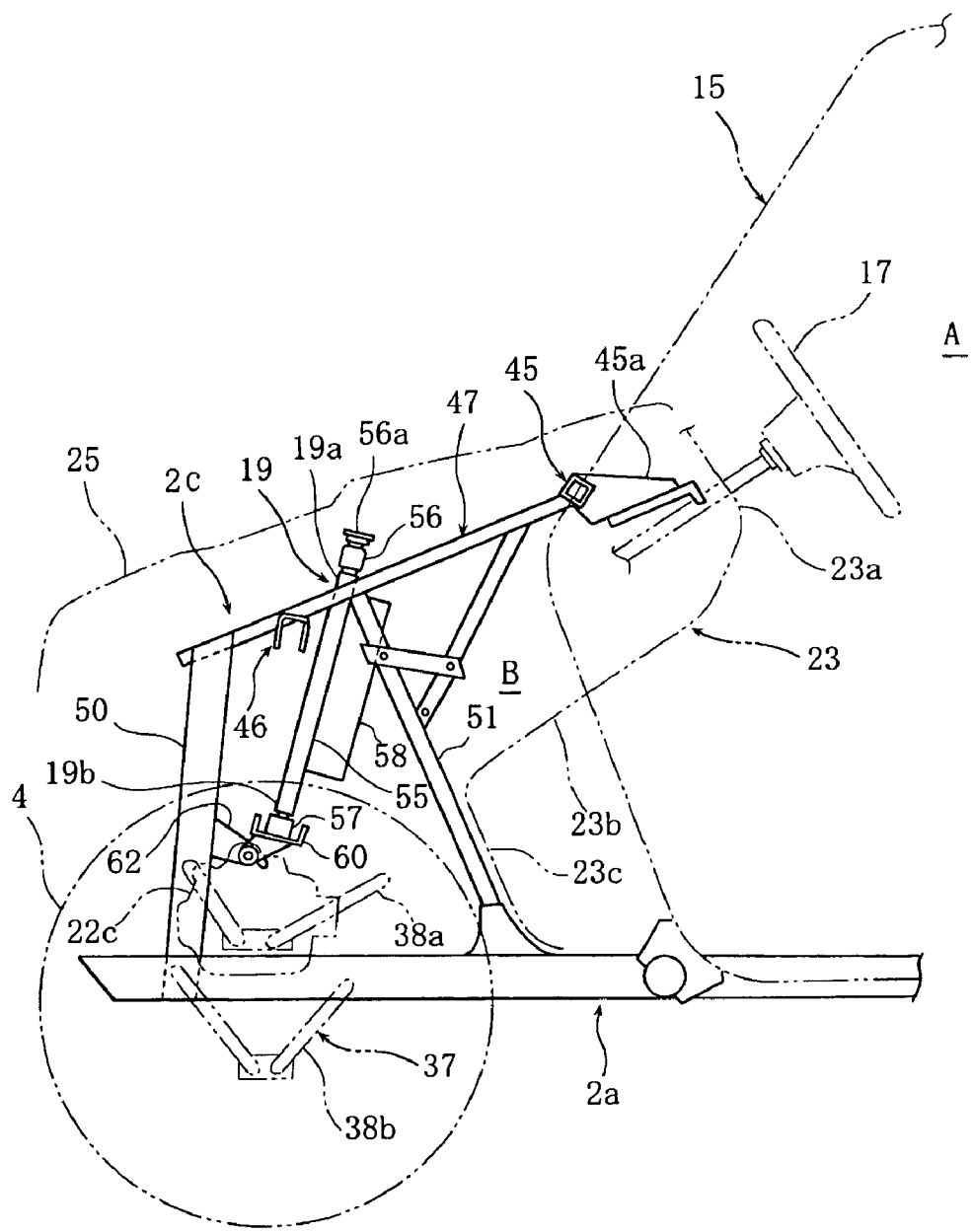
FIG. 4 is a side view of a front frame of the vehicle body frame.

As shown in FIG. 4, partition wall 23 includes an upper portion 23a, a frontwardly declined portion 23b, and a lower portion 23c. The upper portion 23a is disposed in a front end portion of pillar frame 2b, and instruments (not shown), such as a speed meter, are disposed on it. The frontwardly declined portion 23b extends obliquely downward and forward from the upper portion 23a. The lower portion 23c extends obliquely downward and rearward from the frontwardly declined portion 23b. An accelerator pedal (not shown) and a brake pedal are disposed in the lower portion 23c, and a front edge portion of the first floor 8 is connected to the lower portion 23c.

A tunnel portion 24 extending rearward in continuation with the partition wall 23 is formed in a central portion of the partition wall 23 in the vehicle width direction. The tunnel portion 24 is formed convexly into an upwardly protruding shape, in which an upper end of the tunnel portion 24 is located at substantially the same height as the seat surface of the first seat 6.

The front compartment B is a space located ahead of the partition wall 23 and below the hood 25, and communicates with a space in the tunnel portion 24. The engine unit 3 is disposed in the tunnel portion 24 located rearward of the partition wall 23.

The engine unit 3 includes a water-cooled four-cycle engine 20 mounted in a central portion of the left and right center members 12, 12 in the front-back direction, a V-belt type continuously variable transmission 21 that changes and the rotation of the engine 20 and outputs it, and a cooling unit 28 that cools the continuously variable transmission 21. The engine 20 has a structure formed by overlay-coupling a cylinder body 20g and a cylinder head 20c on a crankcase 20f. More specifically, the engine 20 is mounted in a manner that a crankshaft 20a is oriented substantially horizontally along the vehicle width direction, and a cylinder axis line 20b is oriented rearward and obliquely upward direction. The engine 20 is disposed so as to be located between the left and right seats 6a and 6b of the first seat 6. As viewed from a vehicle lateral side, the engine 20 is disposed such that a portion of the engine 20 overlaps with the first seat 6. More specifically, the engine 20 is disposed such that the cylinder head 20c of the engine 20 overlaps with the seat cushions 6c.

An intake pipe 30 extending forward the vehicle front direction from the front sidewall of the cylinder head 20c is connected to the front sidewall, and an exhaust pipe 31 extending toward the vehicle rearward direction from a rear sidewall of the cylinder head 20c is connected to the rear sidewall. In a top view, the intake pipe 30 and the exhaust pipe 31 are disposed substantially linearly on a substantially vehicle center line along the front-back direction.

The exhaust pipe 31 includes a first vertical tube portion 31b, a transverse tube portion 31c, a second longitudinal tube portion 31d, and an extending portion 31e. The first vertical tube portion 31b extends substantially vertically and downward from a connection portion 31a connected to the cylinder head 20c. The transverse tube portion 31c extends rearward below the second floor 9 from a lower end of the first vertical tube portion 31b. The second longitudinal tube portion 31d extends in such a manner as to elevate upward from a rear end of the transverse tube portion 31c. The extending portion 31e extends rearwardly from an upper end of the second longitudinal tube portion 31d through a space between the second seat 7 and a rear wheel drive shaft 5a of the rear wheels 5. The exhaust pipe 31 includes a muffler 36 that is disposed in connection to a rear end of the extending portion 31e and is disposed so as to be located rearward of the second seat 7. The muffler 36 has a substantially ellipsoidal shape having a front-back direction dimension greater than a vertical direction dimension, and the axis line thereof is arranged in the vehicle width direction.

The intake pipe 30 is connected to the cylinder head 20c by way of a throttle body 32 equipped with a fuel injection valve 33. A surge tank 34 is interposed midway of the intake pipe 30. The surge tank 34 is disposed frontward of the engine 20 in the tunnel portion 24. An air cleaner 35 is connected to the surge tank 34 by way of an intake air introduction pipe 30a. The surge tank 34 has a volumetric capacity greater than a volumetric capacity of the air cleaner 35.

The air cleaner 35 is disposed in a central portion in the vehicle width direction. As viewed from the side, the air cleaner 35 is disposed between the partition wall 23 in the front compartment B and the hood 25. An intake port 35a is connected and formed to a rear wall of the air cleaner 35. The intake port 35a is located higher than upper ends 4b of the respective front wheels 4, and is opened towards the rear side in the front compartment B.

The continuously variable transmission 21 includes a transmission case 21a, a drive pulley 21b, a driven pulley 21d, and a V belt 21e. The transmission case 21a is integrally coupled to a left side in the vehicle width direction of the engine 20 and extends frontward from the engine 20. The drive pulley 21b is housed in the transmission case 21a and is mounted to the crankshaft 20a of the engine 20. The driven pulley 21d is mounted to an output shaft 21c parallel to the crankshaft 20a. The V belt 21e is wound around the drive pulley 21b and the driven pulley 21d.

Front and rear power transmission shafts 22a and 22b disposed towards the front-back direction are connected to the output shaft 21c. The front and rear power transmission shafts 22a and 22b are, respectively, connected to front and rear wheel drive shafts 4a and 5a via front and rear differential unit 22c and 22d.

The cooling unit 28 includes a cooling air introduction duct 40 that introduces cooling air into the continuously variable transmission 21, and a cooling air discharge duct 41 that discharges air after cooling. The cooling air introduction duct 40 is routed towards the vehicle's forward side from the transmission case 21a. An air inlet 40a of the cooling air introduction duct 40 is located higher than the upper ends 4b of the front wheels 4 (same herein below), and is opened in the vicinity of a right wall of the air cleaner 35 in the vehicle width direction in the front compartment B. The cooling air discharge duct 41 is routed towards the vehicle front side from the transmission case 21a. An air outlet 41a of the cooling air discharge duct 41 is located higher than the upper edges 4b of the front wheels 4, and is opened downward and rearward in the front compartment B.

The left and right front wheels 4 are supported by the vehicle body frame 2 via front wheel suspension systems 37 so as to be vertically and pivotally moveable. The left and right front wheel suspension systems 37 respectively are connected to the front frame 2c, and include upper and lower arm members 38a and 38b that supports the front wheels 4 to be vertically and pivotally, and rotatably moveable, and cushion units 39 that interconnects between the upper arm members 38a and the front frame 2c.

The front frame 2c includes a first front cross frame 45, a second front cross frame 46, a first front side frame 47, and a second side frame 48. The first front cross frame 45 is disposed frontward of passenger compartment A higher than the main frame 2a, and extends along the vehicle width direction. The second front cross frame 46 is disposed forward of and lower than the first front cross frame 45, and extends along the vehicle width direction. The first and second front side frames 47 and 48, respectively, are disposed so as to extend in the front-back direction on the left and right side in the vehicle width direction, and interconnect the first and the second front cross frames 45 and 46 forming a protective environment for radiator 19.

The front frame 2c further includes left and right front pillar members 50 and left and right rear pillar members 51 that, respectively, extend upward from left and right center members 12 of main body frame 2a to interconnect with first and second front side frames 47 and 48

As shown in FIG. 4, the various frame members of front frame 2c are of differing height to provide an inclined upper frame profile. In application, first and second frit side frames 47 and 48 incline from a lowest point at their respective interconnections with front pillar members 50 to their highest point at their interconnection with first frame cross frame 45. Along their respective lengths, second front cross frame is elevated in relation with front the front pillars and the rear pillars are elevated with respect to second front frame member.

In application, the first front cross frame 45 is formed of an angular pipe, and the left and right end portions thereof are respectively connected to the left and right pillar members 15. A steering support bracket 45a for supporting the steering wheel 17 is connected to the left end portion of the first front cross frame 45.

The respective first and second front side frames 47 and 48 are formed of an angular pipe, and a rear end portion thereof is connected to the first front cross frame 45 and extends linearly along a frontward and downward direction from the first front cross frame 45. In other words, the respective first and second front side frames 47 and 48 are disposed to extend rearward and upward so that a portion located more rearward in the vehicle front-back direction is located higher.

The second front cross frame 46 has a U-shaped cross section that is downwardly opened, and is connected to front end portions of the respective first and second front side frames 47 and 48. Left and right end portions 46aL, 46aR of the second front cross frame 46, respectively, protrude outward in the vehicle width direction from the first and the second front side frames 47 and 48.

Figure 5:
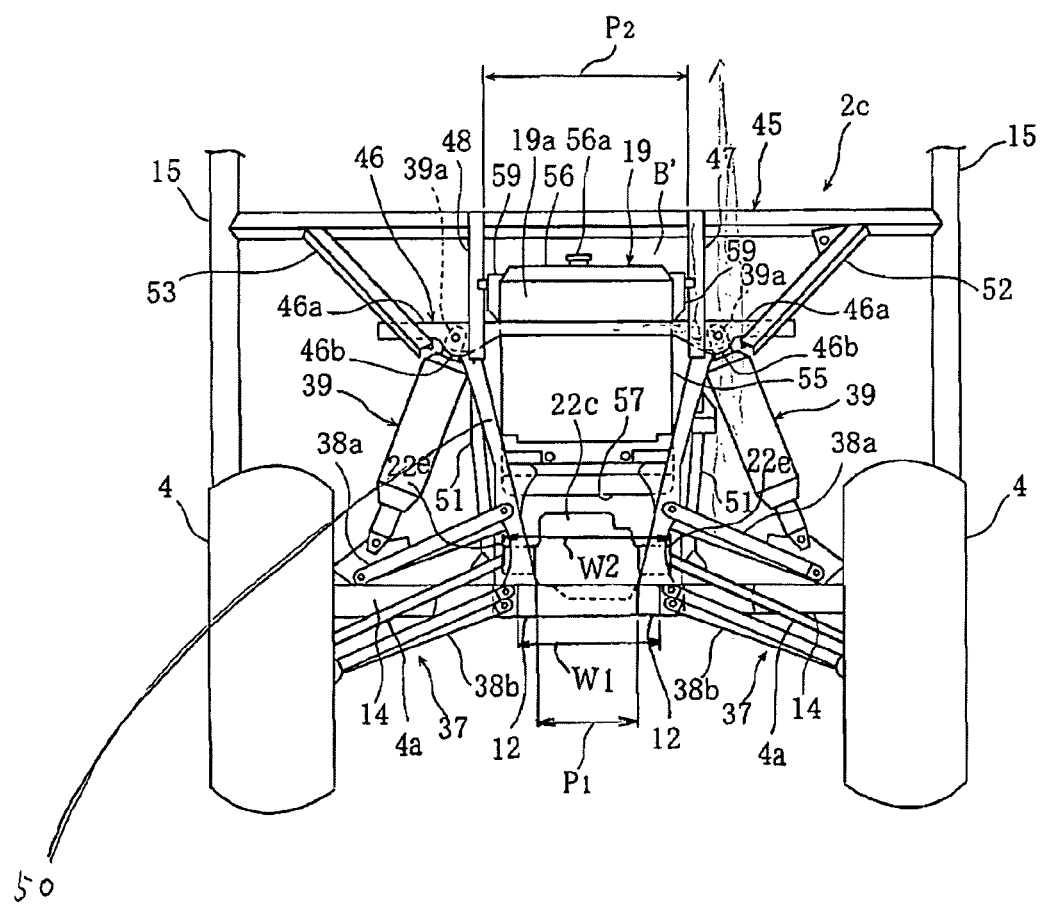
FIG. 5 is a front view of the front frame.

As shown in FIG. 5, to provide further support to second front cross frame 46, left and right front side members 52 and 53 extend along the front-back direction and are disposed on the outer sides of the first and the second front side frames 47 and 48 in the vehicle width direction. First and second front side frames 47 and 48 are inclined and in the preferred embodiment are inclined up to an angle of sixty-eight degrees as measured against a vertical axis along its length. The left and right side members 52 and 53, respectively, have rear end faces connected to the first front cross frame 45 and front end portions connected to the left and right end portions 46a of the second front cross frame 46.

The left and right front side members 52 and 53, respectively, are located at the same heights as the first and the second front side frames 47 and 48, and are disposed so that the vehicle widthwise distance becomes narrower towards the vehicle front side.

As shown in FIG. 5, a vehicle widthwise distance P1 between the left and right center members 12 is set smaller than a vehicle widthwise distance P2 between the first and the second front side frames 47 and 48. This arrangement enables increasing arm lengths of the respective upper and lower arm members 38a and 38b on the left and right sides.

Further, with reference to FIG. 5, as viewed from the vehicle front side, the front differential unit 22c is disposed in such a manner as to bridge between the left and right center members 12. It is formed in the manner that a vehicle-lateral dimension W1 between the left and right center members 12 is smaller than a vehicle-lateral dimension W2 inclusive of joint portions 22e of the front differential unit 22c to which the front wheel drive shaft 4a is connected.

The front frame 2c further includes first and second brackets 46b, 46b respectively provided near connection portions of the second cross frame 46 with the first and the second side frames 47 and 48. The first and second brackets 46b, 46b, respectively, are formed integrally with left and right end portions 46a of the second cross frame 46. Upper end portions 39a of the left and right cushion units 39 are, respectively, connected to the first and the second brackets 46b.

As shown in FIG. 5, the respective first and second front cross frames 45 and 46 in combination with first and second front side frames 47 and 48 define a radiator cage having an interior. Radiator 19 is mounted in a manner wherein it is located inside of a rectangular space B' surrounded by the first and second front cross frames 45 and 46 and the first and second front side frames 47 and 48. As is shown by the drawings, a key aspect of the radiator cage is that the radiator does not extend forwardly past the most outer structural surface area of second cross frame 46 and hence is protected from a frontal impact. Radiator 19 is configured as described in detail below.

The radiator 19 is a vertical type radiator that includes a core 55, an upper head tank 56, and a lower head tank 57. The core 55 has a rectangular shape in which the vertical dimension is greater than the vehicle widthwise dimension. The upper head tank 56 is connected to an upper end of the core 55, and temporarily stores coolant that is used to cool the engine 20. The lower head tank 57 is connected to a lower end of the core 55, temporarily stores the coolant cooled when flowing through the core 55, and returns the coolant into the engine 20. By providing the upper head tank 56 and the lower head tank 57, the coolant can be flown evenly into the overall area of the core 55. A radiator cap 56a for opening and closing a filler port for the coolant is fitted to the upper head tank 56. As shown in FIG. 4, an electric fan 58 is disposed on a rear face of the core 55.

Figure 6:
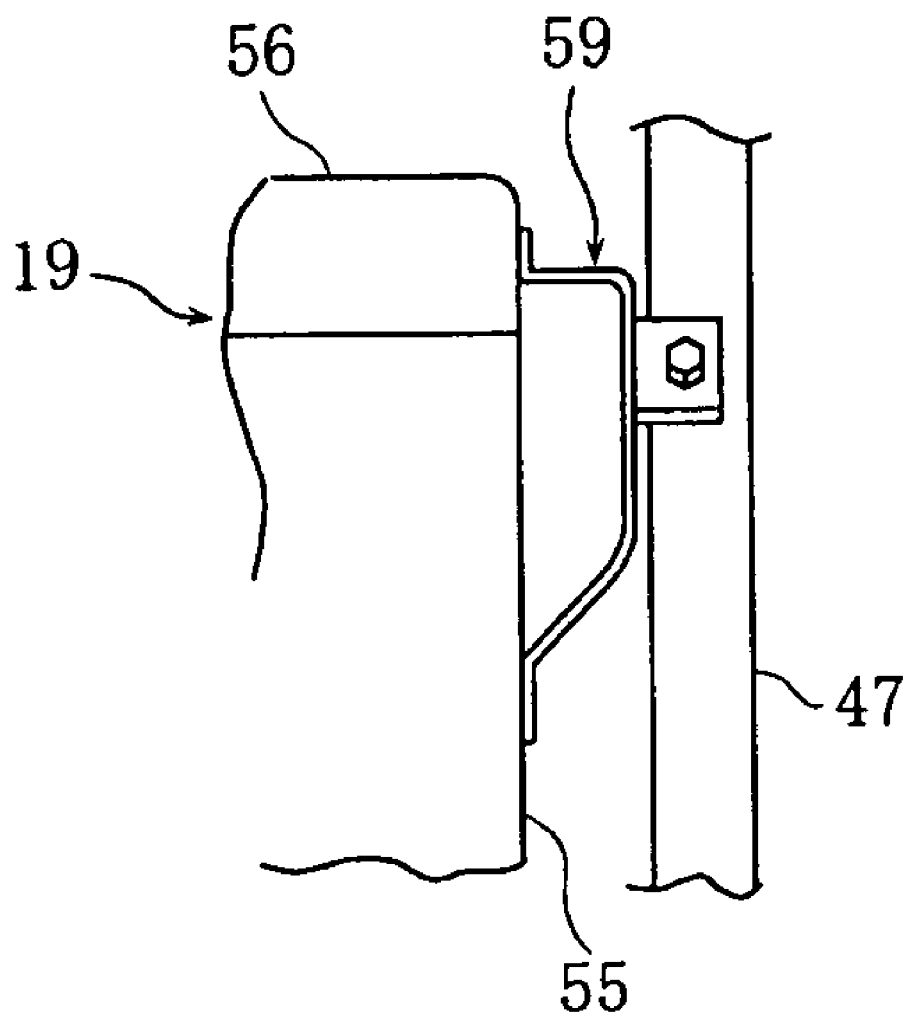
FIG. 6 is a front view of an upper portion of the radiator.

As shown in FIGS. 5 and 6, radiator brackets 59 are mounted to left and right side portions of the upper tank 56, respectively. The left and right radiator brackets 59 are, respectively, fixed with bolts to the first and the second front side frames 47 and 48. Thereby, the upper portion 19a of the radiator 19 is supported by the first and the second front side frames 47 and 48.

Figure 7:
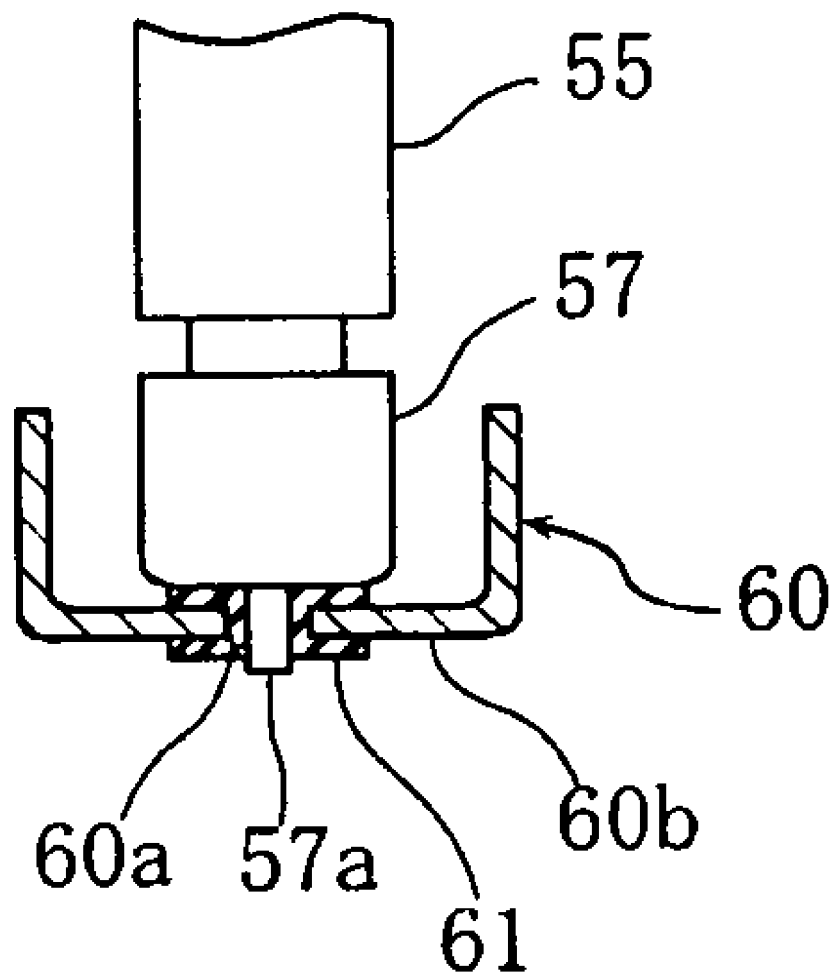
FIG. 7 is a side view of a lower portion of the radiator.

As shown in FIGS. 4 and 7, a radiator projection portion 57a projecting downward is formed to the lower head tank 57. A fixing bracket 62 extending rearward to fix the front differential unit 22c is mounted to the front pillar members 50, and an upward U-shaped fixing bracket 60 which faces upward is fixed together with the fixing bracket 62. A supporting hole 60a is formed in a bottom portion 60b of the fixing bracket 60, and a grommet 61 is mounted to the supporting hole 60a. The protruding portion 57a is inserted into the supporting hole 60a with the grommet 61 interposed there between. Thereby, a lower portion 19b of the radiator 19 is resiliently supported by the front frame 2c via a fixing bracket 60 so as not to be moveable along the front-back and lateral directions.

The radiator 19 is disposed in a manner that the upper portion 19a thereof is located rearward of and near the second front cross frame 46 and projects upward from the first and the second front side frames 47 and 48. The hood 25 is located upward of and near the upper head tank 56.

Further, the radiator 19 is disposed in a manner that the lower portion 19b thereof is located downward of the second front cross frame 46, and the upper portion 19a is located rearward of the second front cross frame 46. More specifically, the radiator 19 is disposed in a rearwardly inclined state where a portion thereof is located more rearward as it is located more upward. While the invention is intended to providing for the inclination of the radiator from even a small five degree incline, in the preferred embodiment, radiator 19 is able to be inclined preferably at an angle up to fifteen degrees as measured against a vertical axis. Thereby, as viewed from the vehicle lateral side, the upper portion 19a of the radiator 19 is rearwardly inclined so brackets 59 may join them with first and the second front side frames 47 and 48.

According to the present embodiment, the upper portion 19a of the radiator 19 is disposed inside the rectangular space B'. The rectangular space B' is surrounded by the second and first front cross frames 46 and 45, which extend in the vehicle width direction and are disposed in the front and rear portions spaced apart from each other ahead of the passenger compartment A, and the first and the second front side frames 47 and 48, which extend along the vehicle front-back direction and interconnect the first and the second front cross frames 45 and 46. Hence, the first and the second front cross frames 45 and 46 and the first and the second front side frames 47 and 48 function as protection members. This enhances the protection performance of the radiator 19 against external forces exerted from both the vehicle lateral sides and vehicle front side.

As described above, the first and the second brackets 46b, 46b respectively, for supporting the upper end portions 39a of the cushion units 39 are provided near the connection portions of the second cross frame 46 with the first and the second front side frames 47 and 48. Hence, input power transmitted from the front wheels 4L and 4R via the left and right cushion units 39 can be supported by the entirety of the front frame 2c having a high stiffness, consequently enabling enhancing the support stiffness of the cushion units 39. This is accomplished as the upper end portions 39a are provided near the connection portions then first and second side frames 47 and 48 can assist in the support. If end portions 39a were not provided near the connection portions, then side frames 47 and 48 could not provide much support.

Further, since the first and the second brackets 46b, respectively, are formed integral with the second front cross frame 46, the number of parts is not increased, therefore enabling inhibiting costs from increasing.

In the present invention, the configuration may be such that the first and the second brackets 46b are formed independently of the second front cross frame 46, and are disposed near the connection portions of the second front cross frame 46.

In the present embodiment, the radiator 19 is disposed in a manner that the lower portion 19b thereof is located downwardly of the second front cross frame 46, and the upper portion 19a thereof is located rearward of the second front cross frame 46. As viewed from the vehicle lateral side, the radiator 19 is disposed in the rearwardly inclined state in which the upper portion 19a thereof is located more rearward as it is located more upward; that is, the lower portion 19b thereof is more frontward as it is located more downward. Consequently, the vertical dimension of the radiator 19 can be increased, and hence the cooling performance can be improved corresponding thereto. More specifically, since the hood 25 is located near the upper portion of the radiator 19, in the case where, for example, the radiator 19 is disposed upright, the vertical dimension thereof has to be reduced to prevent interference with the hood 25. In the present embodiment, the radiator 19 is rearwardly inclined, so that the size of the radiator 19 can be increased.

In the present embodiment, the radiator 19 is disposed to diagonally intersect with the first and the second front side frames 47 and 48. From this respect as well, the size of the radiator 19 can be increased, thereby enabling the cooling performance to be enhanced.

In the present embodiment, the radiator 19 is the vertical type radiator in which the upper and lower head tank 56 and 57 are, respectively, connected to the upper and lower ends of the core 55. Further, the lower head tank 57 is resiliently supported by means of the fixing bracket 60 of the front frame 2c. Consequently, the size of the radiator 19 can be increased while preventing interference with the hood 25, and hence the cooling performance can be improved. In other words, it is more advantageous in terms of the cost to increase the radiation area size by increasing the core length rather than increasing the number of cores. In the present embodiment, since the radiator 19 is of the vertical type, the radiation area size can be increased by increasing the core length.

In the present embodiment, the first and the second front side frames 47 and 48 are each inclined upwardly in an upward direction towards the vehicle rear so that it is positioned higher as it comes nearer to the vehicle rearward direction. Consequently, the inclination angle of the radiator 19 can be increased while preventing the interference with the hood 25, and the size of the radiator 19 can be increased corresponding thereto.

What is claimed is:

1. A vehicle including a main body frame having a length direction and a width direction, the vehicle comprising:
   a front frame carried by said main body frame including:
      a first front cross frame extending along said width direction of the main body frame;
      a second front cross frame that is disposed frontward and offset from said first front cross frame at an elevational height less than an elevational height of said first front cross frame and that extends along the width direction of the main body frame;
a first front side frame and a second front side frame that are, respectively, disposed on a left side and a right side of the main body frame as to extend along the length direction of the main body frame, and that respectively interconnect the first front cross frame and the second front cross frame to define a radiator cage having an interior space;
said first front side frame and said second front side frame being inclined from said second front cross frame to said first front cross frame;
a radiator disposed within said interior space of said radiator cage;
a left cushion unit including an upper end attached to the second front cross frame and a lower end attached to a front wheel suspension; and
a right cushion unit including an upper end attached to the second front cross frame and a lower end attached to the front wheel suspension.

2. The vehicle of claim 1, wherein said radiator cage includes a left pillar member and a right pillar member interconnecting said first and second front side frames with said main body frame, said radiator being carried by said left and right pillar members via a fixing bracket which also carries a front differential unit.

3. The vehicle of claim 1 wherein the front wheel suspension includes left and right upper arm members attached to front wheels at a location forward of said radiator.

4. The vehicle of claim 1, wherein said radiator includes a primary body portion and an upper portion and a lower portion, and wherein said radiator is carried within said radiator cage such that said upper portion and said primary body portion are inclined from the lower portion to said upper portion relative to said main body frame.

5. The vehicle of claim 4, wherein said incline is greater than five degrees but not greater than fifteen degrees.

6. The vehicle of claim 1, wherein
a first bracket is provided near a connection portion of the second front cross frame with the first front side frame, said first bracket supporting the left cushion unit of the front wheel suspension;
a second bracket is provided near a connection portion of the second front cross frame with the second front side frame, said second bracket supporting the right cushion unit of the front wheel suspension; and
said radiator being mounted in a manner that at least an upper portion of the radiator is located in a rectangular space surrounded by the first and the second front cross frames and the first and the second front side frames.

7. The vehicle according to claim 6, wherein at least said first and second brackets are, respectively, integrally formed near the connection portions of the second front cross frame with the first and the second front side frames.

8. The vehicle according to claim 1, wherein
a hood is disposed above the interior space of said radiator cage; and
the radiator is disposed in a rearwardly inclined state where a portion of the radiator is located more rearward as the portion is located more upward.

9. The vehicle according to claim 1, wherein, as viewed from a vehicle lateral side, the radiator intersects with the first and the second front side frames in an inclined state.

10. The vehicle according to claim 1, wherein the radiator is a vertical type radiator that includes rectangular core and upper and lower head tanks that are respectively connected to an upper end and a lower end of the rectangular core and that flow coolant in a vertical direction, and the lower head tank is supported by a portion of the main body frame.

11. A vehicle including a main body frame having a length direction and a width direction, the vehicle comprising:
a front frame carried by said main body frame including:
a first front cross frame extending along said width direction of the main body frame;
a second front cross frame that is disposed frontward and offset from said first cross frame at an elevational height less than an elevational height of said first front cross frame and that extends along the width direction of the main body frame;
a first front side frame and a second front side frame that are, respectively, disposed on a left side and a right side of the main body frame so as to extend along the length direction of the main body frame, and that respectively interconnect the first front cross frame and the second front cross frame to define a radiator cage having an interior space;
said first front side frame and said second front side frame being inclined from said second front cross frame to said first front cross frame;
a radiator at least partially disposed within said interior space of said radiator cage;
said radiator having a front profile defined by a top radiator portion, a bottom radiator portion, and a radiator body; and
said radiator front profile being carried within said interior space of said radiator cage in a manner wherein said front profile does not extend past a plane defined by a most forward surface of said second front cross frame;
a left cushion unit including an upper end attached to the second front cross frame and a lower end attached to a front wheel suspension; and
a right cushion unit including an upper end attached to the second front cross frame and a lower end attached to the front wheel suspension.

12. The vehicle of claim 11, wherein said radiator cage includes a left pillar member and a right pillar member interconnecting said first and second front side frames with said main body frame, said radiator being carried by said left and right pillar members via a fixing bracket which also carries a front differential unit.

13. The vehicle of claim 11, wherein said radiator includes a primary body portion and an upper portion and a lower portion, and wherein said radiator is carried within said radiator cage such that said upper portion and said primary body portion are inclined from the lower portion to said upper potion relative to said main body frame.

14. The vehicle of claim 11, wherein
a first bracket is provided near a connection portion of the second front cross frame with the first front side frame, said first bracket supporting the left cushion unit of the front wheel suspension;
a second bracket is provided near a connection portion of the second front cross frame with the second front side frame, said second bracket supporting the right cushion unit of the front wheel suspension; and
said radiator being mounted in a manner that at least an upper portion of the radiator is located in a rectangular space surrounded by the first and the second front cross frames and the first and the second front side frames.

15. The vehicle according to claim 14, wherein at least said first and second brackets are, respectively, integrally formed near the connection portions of the second front cross frame with the first and the second front side frames.

16. The vehicle according to claim 11, wherein
a hood is disposed above the interior space of said radiator cage; and
the radiator is disposed in a rearwardly inclined state where a portion of the radiator is located more rearward as the portion is located more upward.

17. The vehicle according to claim 11, wherein, as viewed from a vehicle lateral side, the radiator intersects with the first and the second side frames in an inclined state.

18. The vehicle according to claim 11, wherein the radiator is a vertical type radiator that includes a rectangular core and upper and lower head tanks that are respectively connected to an upper end and a lower end of the rectangular core and that flow coolant in a vertical direction, and the lower head tank is supported by a portion of the main body frame.

* * * * *